(No Model.)

E. S. STIMPSON.
ART OF MANUFACTURING RINGS FOR LOOM TEMPLES.

No. 388,155. Patented Aug. 21, 1888.

WITNESSES
Fred L. Emery
John F. C. Prendergast

INVENTOR
Edward S. Stimpson
by Crosby & Gregory
attys

UNITED STATES PATENT OFFICE.

EDWARD S. STIMPSON, OF HOPEDALE, MASSACHUSETTS, ASSIGNOR TO THE DUTCHER TEMPLE COMPANY, OF SAME PLACE.

ART OF MANUFACTURING RINGS FOR LOOM-TEMPLES.

SPECIFICATION forming part of Letters Patent No. 388,155, dated August 21, 1888.

Application filed March 29, 1887. Serial No. 232,846. (No model.)

*To all whom it may concern:*

Be it known that I, EDWARD S. STIMPSON, of Hopedale, county of Worcester, and State of Massachusetts, have invented an Improvement in the Art of Manufacturing Rings for Loom-Temples, of which the following description, in connection with the accompanying drawings, is a specification, like letters on the drawings representing like parts.

Loom-temples of the class represented in United States Patent No. 228,256, dated June 1, 1880, contain a series of rings having beveled peripheries provided with teeth, the teeth, in the rotation of the rings upon a stud or sleeve carrying them, entering the cloth being woven and serving to stretch the same in the direction of its width.

In the manufacture of this class of temple-ring considerable difficulty is experienced in boring the holes for the reception of the teeth, the difficulty lying chiefly in the glancing of the point of the drill from the beveled surface to be drilled.

In my experiments to devise means whereby the beveled surface-rings might be easily and quickly drilled in proper manner I have discovered that the points of the drills may be readily made to enter the rings correctly, provided the rings have depressions or recesses for the reception of the point of the drill, to thus prevent it glancing off laterally. In accordance with my invention I have provided the peripheries of the temple-rings with one or more annular grooves, according to the number of rows of teeth in each ring, the point of the drill readily entering the annular groove, the latter serving to hold the point of the drill in place and preventing it from glancing.

Figure 1:
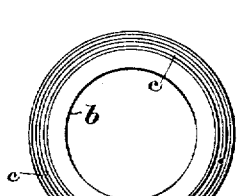
Figure 2:
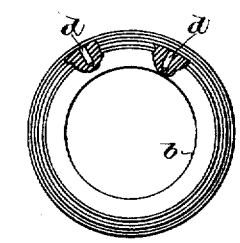
Figure 3:
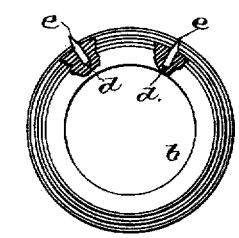
Figure 4:
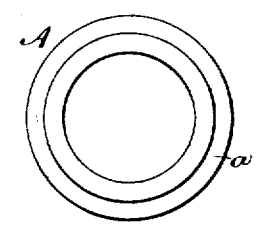
Figure 5:
Figure 6:
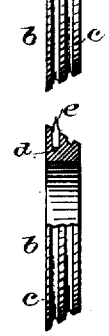
Figure 7:

Figure 1 in elevation shows a temple-ring made in accordance with my invention; Fig. 2, a like view of a ring partially broken out to show holes made therein for the reception of the pins or teeth; Fig. 3, a like view with two of the pins or teeth inserted. Fig. 4 is a like view of a common ring such as used prior to my invention; and Figs. 5, 6, 7, and 8 are partial sections, respectively, of the rings shown in Figs. 1, 2, 3, and 4.

Figure 8:

Referring first to Figs. 4 and 8, A represents an ordinary ring, it having a plain beveled periphery, as *a*, which in practice is with much difficulty drilled for the reception of pins or teeth.

Referring to Fig. 1, *b* represents a ring substantially the same as the ring A, with the exception that the beveled periphery of the ring has one or more than one annular groove, *c c*.

A ring provided with an annular groove or grooves such as shown may be quickly and easily drilled with holes, as *d*, for the reception of teeth or pins, as *e*, for when the point of the usual drill employed for boring the ring approaches the ring and enters the annular groove it is impossible for the point of the drill to glance off or to ride down the smooth inclined periphery of the ring. Providing the rings with annular grooves or depressions such as shown enables very much time to be saved when making the holes for the reception of the pins.

In Figs. 2 and 3 the holes are marked *d*. Fig. 3 shows two of the holes as provided with pins *e*.

I do not desire to limit my invention to the exact configuration in cross-section of the annular grooves made in the rings, as they may be modified without departing from my invention.

I claim—

The herein-described improvement in the art or method of manufacturing temple-rings, which consists, first, in providing the periphery of the said ring with one or more annular grooves or depressions for the reception of the point of the drill, and, second, boring the holes for the reception of pins with the point of the drill in said groove or depression, whereby the said drill is prevented from glancing off or being displaced, substantially as described.

In testimony whereof I have signed my name to this specification in the presence of two subscribing witnesses.

EDWARD S. STIMPSON.

Witnesses:
G. W. GREGORY,
C. M. CONE.